United States Patent [19]

Keller

[11] Patent Number: 4,483,573
[45] Date of Patent: Nov. 20, 1984

[54] TOOL ADAPTER FOR WORKING TABLE TOP STORAGE CABINET

[76] Inventor: David L. Keller, 313 Kelly Dr., Decherd, Tenn. 37324

[21] Appl. No.: 396,811

[22] Filed: Jul. 9, 1982

[51] Int. Cl.³ .............................................. A47B 81/00
[52] U.S. Cl. ................................... 312/281; 83/477.2; 83/574; 108/107; 144/286 R; 312/257 SK; 312/351; 312/DIG. 33
[58] Field of Search ............... 312/DIG. 33, 280, 281, 312/304, 306, 351, 324, 257 R, 321, 282, 231, 257 SK; 144/286 R; 83/574, 477.2; 108/107; 220/85 D; 206/349

[56] References Cited

U.S. PATENT DOCUMENTS

| | | | |
|---|---|---|---|
| 2,810,412 | 10/1957 | Roug | 83/477.2 |
| 2,893,749 | 7/1959 | Simonsen et al. | 312/DIG. 33 |
| 2,925,920 | 2/1960 | Skubic | 108/107 |
| 2,980,152 | 4/1961 | Slavin | 83/477.2 |
| 3,034,844 | 5/1962 | Anderson et al. | 312/281 |
| 3,955,457 | 5/1976 | Mendelson | 83/477.2 |
| 4,186,784 | 2/1980 | Stone | 83/574 |
| 4,252,239 | 2/1981 | Snyder | 312/DIG. 33 |
| 4,265,283 | 5/1981 | Nash et al. | 144/286 R |
| 4,317,523 | 3/1982 | Konstant et al. | 108/107 |
| 4,335,765 | 6/1982 | Murphy | 83/574 |
| 4,350,193 | 9/1982 | McCambridge et al. | 144/286 R |
| 4,377,099 | 3/1983 | Howe | 83/477.2 |

*Primary Examiner*—William E. Lyddane
*Assistant Examiner*—Thomas A. Rendos
*Attorney, Agent, or Firm*—Abe Hatcher

[57] ABSTRACT

An adapter which is double L-shaped with a horizontal portion joining the tops of the upright portions of the L's together, the horizontal portions of the L's being directed in opposite directions, enables each of a plurality of tools to be connected via upper and lower clamps, one at a time, to a specially constructed multi-compartment cabinet having adjustable shelves, the adapter, upper and lower clamps and all other parts necessary to place the tool in a working position on the cabinet being available separately for assembly from a kit.

5 Claims, 6 Drawing Figures

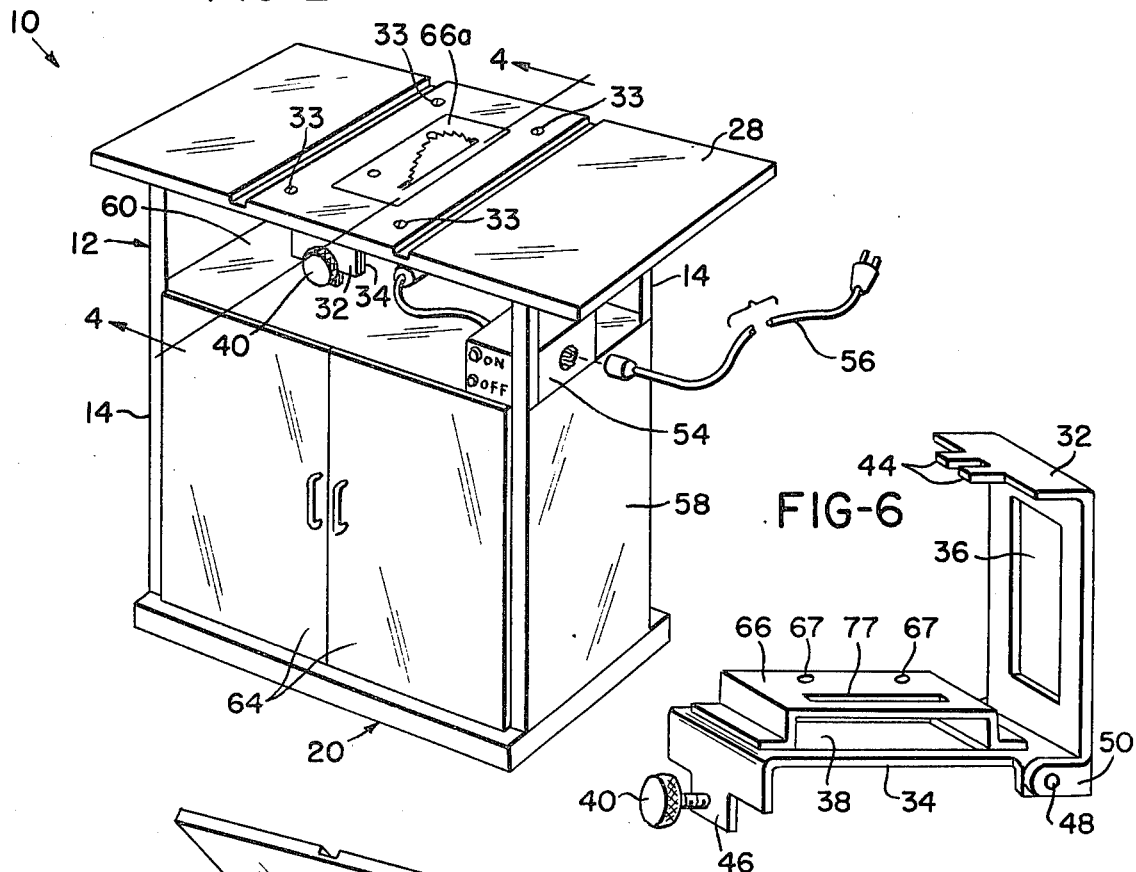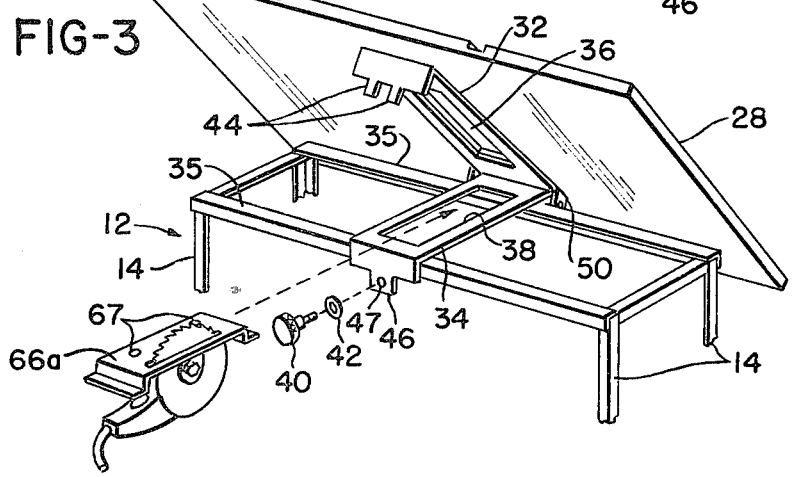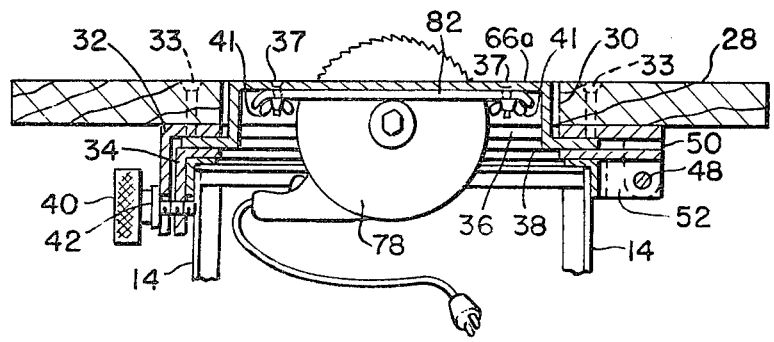

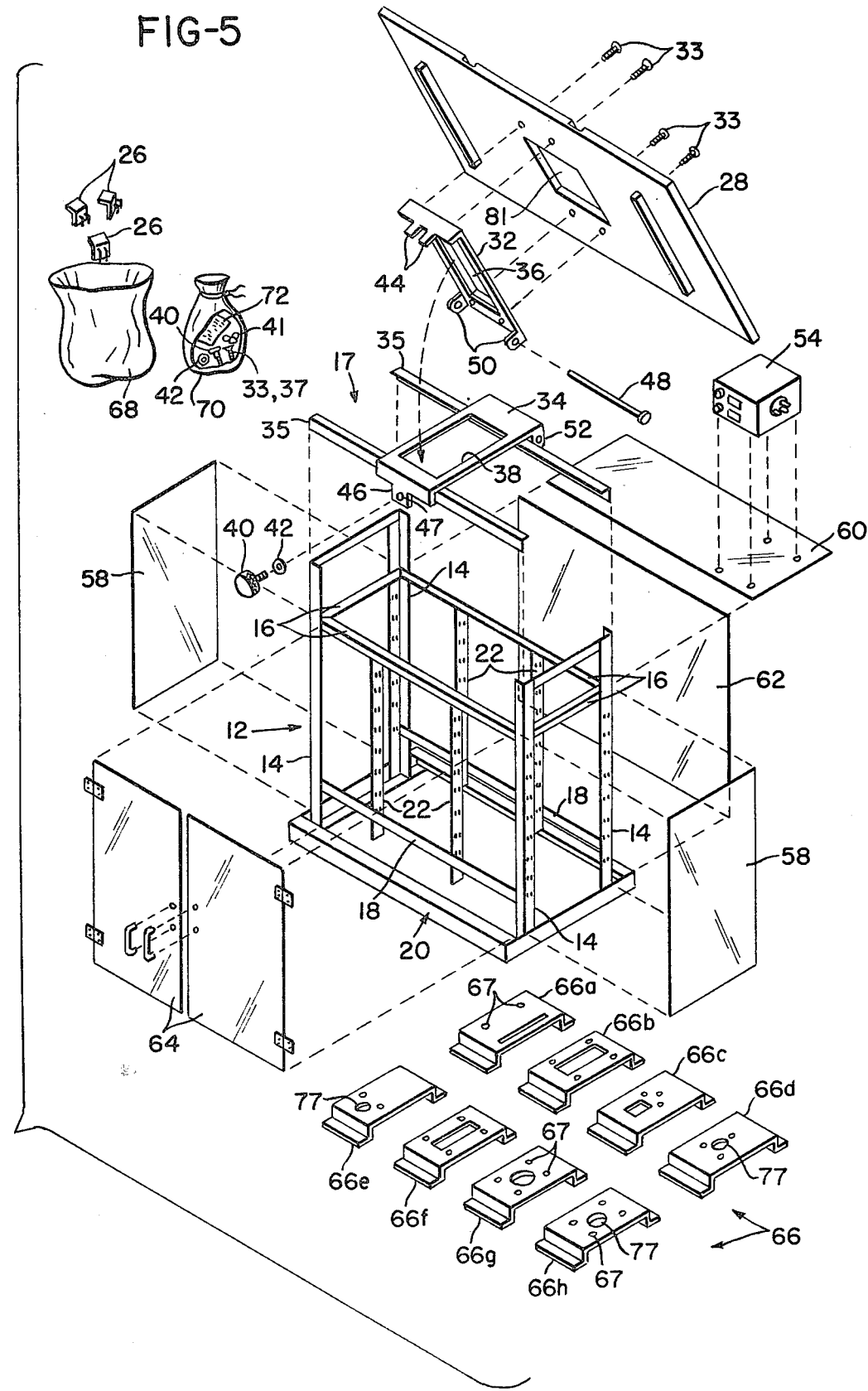

TOOL ADAPTER FOR WORKING TABLE TOP STORAGE CABINET

BACKGROUND OF THE INVENTION

1. Field of the Invention

This invention relates to power and like tools and their use. More particularly, it relates to an adapter which may be modified for use with various power tools and hand tools so that they may be fastened to and worked with on the top of a cabinet in which they may also be stored when not in use.

2. Description of the Prior Art

Until now the home craftsman has had no convenient way to remove tools from storage and use them one by one as needed in an installed position on a working table right where stored.

SUMMARY OF THE INVENTION

After extended investigation I have developed an adapter which may easily be modified to fit on a working surface which has an opening therein for installation of the tool with an upper and lower clamp used in conjunction with the adapter. According to my invention I prefer that the working surface be the top of a cabinet which has storage spaces therein for as many as eight or more home-type portable power or like tools each joined to its own adapter, for example, hand drill, disc grinder, skill saw, circular saw, jig saw, router, belt sander, power drill and power planer. Adjustable shelf brackets and hooks of the clip-on type, adjustable shelf bracket bars and anchor holes are used together for forming shelves to hold the base portions of the L's of a double L-shaped adapter which has a horizontal portion to join the tops of the upright portions of the L's, the adapter usually being attached to the tool. A particular advantage of my invention is that the adapter, together with the various parts or components of the storage cabinet, including hinged clamps to be used with the adapter when placing the tool in working position on top of the cabinet which has a specially constructed hole or opening for the tool to fit into when installed, may be included in a kit for easy assembly.

DESCRIPTION OF THE DRAWING AND OF THE PREFERRED EMBODIMENT

For a better understanding of my invention reference will now be made to the drawing, which is illustrative of the preferred embodiment.

In the drawing,

FIG. 2 is a perspective view of a power tool cabinet completely assembled according to the invention, including side and top panels, door and rear panel and switch outlet box.

FIG. 3 is a perspective view showing the working top of a cabinet such as that of FIGS. 1 and 2 hinged back to reveal upper and lower clamps on the table or cabinet frame and a schematic arrangement of a circular saw with adapter attached thereto according to the invention ready to be placed in position and held there by clamps, locking knob and washer.

FIG. 4 is a section taken at 4—4 of FIG. 2, showing the details of how the circular saw may be secured in working position on the cabinet top according to the invention.

Figure 1:
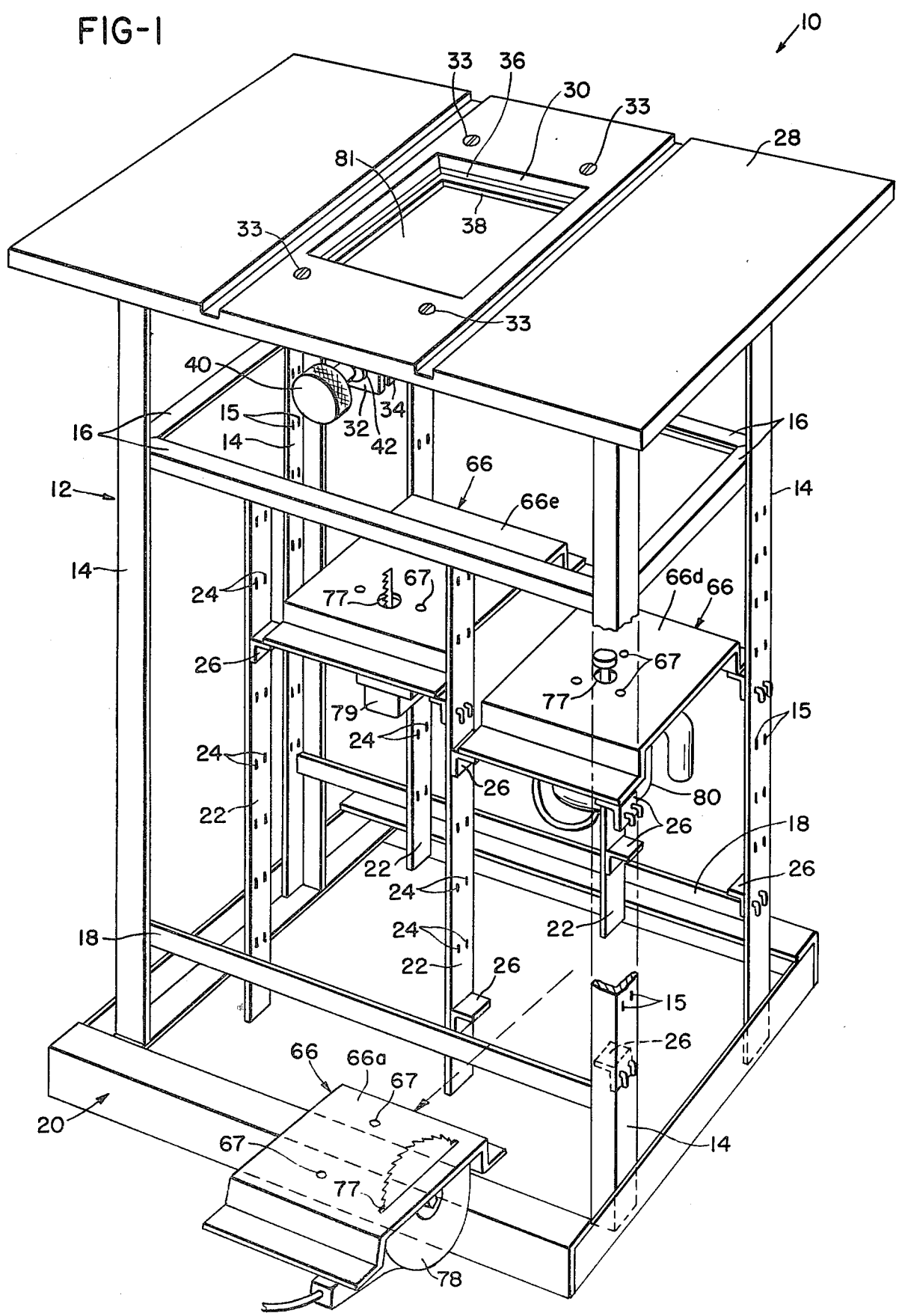
FIG. 1 is a perspective view of a power tool cabinet such as that of the invention showing a circular saw with an attached adapter such as that of the invention being withdrawn from its storage position on shelf bracket hooks inside the cabinet.

FIG. 5 sets out in perspective in bracketed kit form the components for putting together the power tool cabinet of the invention, including the adapter as modified for use with several power tools.

FIG. 6 depicts an adapter in position on a lower clamp according to the invention with upper clamp in open position.

In the drawing, a representative power tool cabinet according to the invention is generally indicated by 10, the cabinet having a frame structure 12, which may be a separate component of a kit such as shown in FIG. 5, made up of upright support members 14 having notches 15, upper cross braces or crossbracing 16, lower braces or bracing 18 and base 20. All the rest of the basic components of the power tool cabinet or table 10 with adapters 66 (a, b, c, d, e, f, g and h indicating respectively the adapter for circle or circular saw, power planer, reciprocating saw, router, sabre saw, belt sander, disc sander and power drill, for example, and 67 and 77 indicating bolt holes and cutter blade holes or like openings, respectively, in adapters 66 for attachment of the various power tools and hand tools) are also basic components of the kit of the invention which may be used for putting the tool working cabinet together. The tools may be conveniently stored in the cabinet 10 when not in use, preferably with the adapters 66 attached thereto for ease of fitting securely on shelf brackets 26, which fit in notches 24 in notched bracket support strips 22.

Working surface or top 28 has a substantially centrally located opening or flush mount hole 30, 81 therein so that any power tool may be inserted therein or therethrough with the aid of an adapter 66 and upper and lower clamps 32 and 34, as can be seen more readily from FIGS. 2–4. Lower clamp 34, which has a rectangular opening 38 therein, may be part of a lower clamp assembly 17 (FIG. 5) which includes top bars or angles 35 for frame 12 and is depicted in detail in FIG. 6. Upper clamp 32, having an opening 36 therein, includes alignment tangs 44 and a hinge portion or projection 50 for use when closed down as shown in FIG. 4 and used with with hinge pin 48. Lower clamp 34 also has a threaded projection 46 with a threaded opening 47 therein, a hinge projection 52 and a locking knob 40 with washer 42 for use as shown in FIGS. 3 and 4. Bolts used in assembly of the working cabinet 10 include long flathead bolts 33 and short flathead bolts 37 used in conjunction with wingnuts 41. Sacks 68 and 70 may be used to hold these nut and bolt and like parts or components of the kit for assembly of the power tool cabinet or working table 10 as well as an instruction sheet 72. Top panel 60, side panels 58, hinged doors 64 and a rear panel 62 (FIG. 5) may be used on frame 12 to make a finished cabinet 10, if desired, as shown in FIG. 2, with the blade of circular power saw 78 seen emerging at the top of the cabinet 10. Tool shoe 82, shown as a conventional part of circular power saw 78, is also customarily provided with other commercially available power tools. Shown shelved in cabinet 10 of FIG. 1 are a router 80 and a sabre saw 79. An optional switch and receptacle box 54 with a power cord 56 may also be supplied as a part of the kit, if desired.

While the invention has been described in terms of preferred embodiments thereof, the claims appended hereto are intended to encompass all embodiments which fall within the spirit of the invention.

Having thus described my invention and certain preferred embodiments thereof, I claim:

1. A kit having as components thereof an adapter for use in anchoring a power tool on a working surface, said adapter comprising a substantially U-shaped member bounded on each side by the upright portion of an L, said upright portion of said L having a base portion of said L extending horizontally from the bottom thereof, upper and lower clamps of a shape similar to said adapter but without said extending base portion of said L, said clamps being adapted to hinge together and hold said power tool in place with said adapter.

2. The kit of claim 1 having as additional components thereof cabinet parts adapted for assembly as a cabinet for storage of power tools therein and attachment of said adapter with power tool in working position on a top thereof, said cabinet parts comprising a frame for said cabinet, a top for said cabinet having an opening therein as an aid in securing said adapter with power tool to said top, top members for said frame for securing the lower clamp in position, a base for said cabinet, notched bracket support strips, brackets for holding said adapter with power tool and means for holding said components together.

3. The kit of claim 2 having as additional components thereof at least one door, side panels and a rear panel.

4. The kit of claim 2 having as additional components thereof nuts, bolts, pins and washers for holding said components together as an assembled unit.

5. The kit of claim 4 with said components thereof assembled to form a cabinet having said adapter with power tool secured to said top in a working position.

* * * * *